No. 745,864. PATENTED DEC. 1, 1903.
H. E. W. KIRKLAND.
COTTON OR RICE CHOPPER.
APPLICATION FILED JULY 27, 1903.
NO MODEL.

H. E. W. Kirkland, Inventor,

Witnesses
Howard D. Orr.
H. J. Riley.

By E. G. Siggers
Attorney

No. 745,864. Patented December 1, 1903.

UNITED STATES PATENT OFFICE.

HENRY E. W. KIRKLAND, OF SMITHDALE, MISSISSIPPI.

COTTON OR RICE CHOPPER.

SPECIFICATION forming part of Letters Patent No. 745,864, dated December 1, 1903.

Application filed July 27, 1903. Serial No. 167,205. (No model.)

*To all whom it may concern:*

Be it known that I, HENRY E. W. KIRKLAND, a citizen of the United States, residing at Smithdale, in the county of Amite and State of Mississippi, have invented a new and useful Cotton or Rice Chopper, of which the following is a specification.

The invention relates to improvements in cotton and rice choppers.

The object of the present invention is to improve the construction of cotton and rice choppers and to provide a simple and comparatively inexpensive one of great strength and durability adapted to run easy and capable of rapidly cutting out rice and cotton plants.

A further object of the invention is to provide a cotton and rice chopper of this character which will permit a horse to walk in the furrow at one side of the row operated on and which will be provided with a front guide-wheel arranged to run in the furrow at the opposite side of said row, whereby the cotton-chopper will be caused to run in proper position with relation to the plant.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
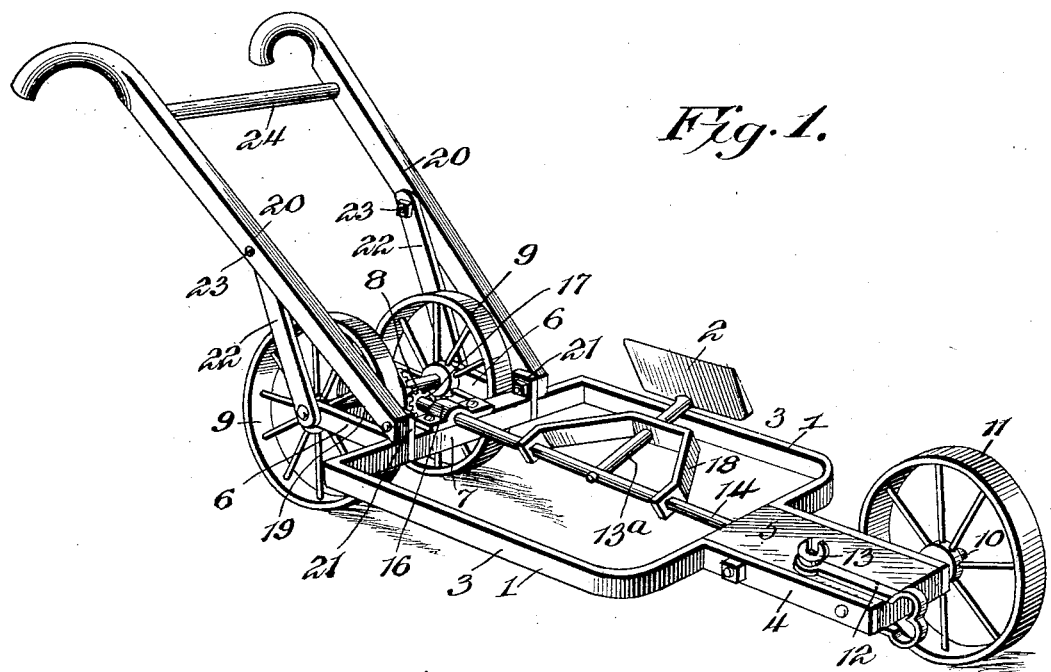
Figure 2:
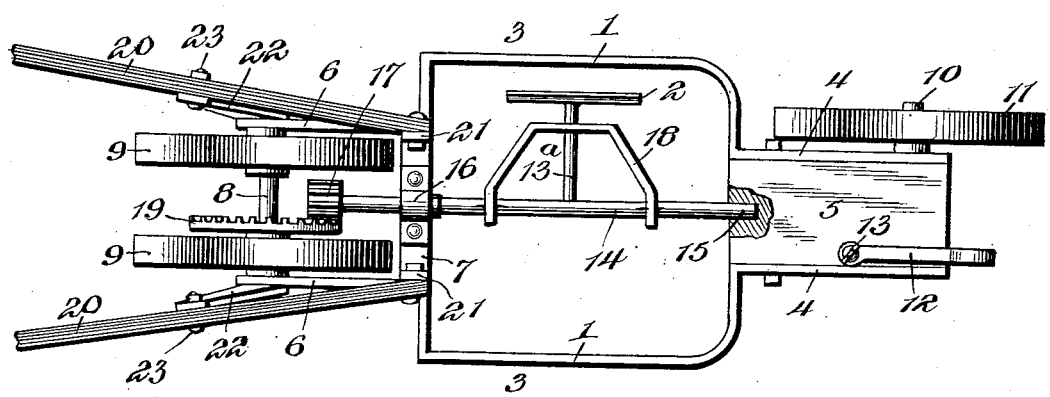

In the drawings, Figure 1 is a perspective view of a cotton and rice chopper constructed in accordance with this invention. Fig. 2 is a plan view of the same.

Like numerals of reference designate corresponding parts in all the figures of the drawings.

1 1 designate similar side bars of a main or supporting frame, the side bars being angularly bent and laterally offset between their ends to provide an opening or space in which the cotton-chopper blade or hoe 2 operates. The angularly-bent approximately U-shaped side portions 3 are arranged opposite each other, and the front portions or arms 4 of the side bars are extended longitudinally of the frame and are spaced apart to receive a front connecting block or piece 5, which is located centrally of the machine. The block or piece 5 may be secured to the front portions or arms in any desired manner, preferably by rods or bolts, which pierce the portions or arms 4 and the block or piece, as clearly illustrated in Fig. 2 of the drawings. The side bars are provided with similar rearwardly-extending portions or arms 6, which are connected at their inner terminals by a transverse bar 7, arranged at the rear ends of the approximately U-shaped bends of the side bars and suitably secured to the latter. The rear terminals of the rearwardly-extending arms or portions 6 are provided with suitable bearings for a transverse axle or shaft 8.

The shaft or axle 8 has mounted upon it a pair of wheels 9, which run in the furrow at opposite sides of the row operated on by the machine and which are adapted to support the weight of the rear portion of the latter. The front portion of the frame is provided with a laterally-extending stub-axle 10, on which is mounted a front guide-wheel 11, arranged to run in the furrow at one side of the row operated on by the machine and adapted to support the weight of the front portion of the same. The laterally-extending stub-axle is located at one side of the block or piece 5, at the front end thereof, and it may be formed of an extension of the adjacent fastening device for securing the side bars to the block or piece 5. A clevis 12 is pivotally connected by a pin 13 to the block or piece 5 and is located at the opposite side edge thereof and is adapted to permit a horse to walk in the furrow at one side of the row operated on by the machine, the guide and supporting-wheel 11 being located at one side of such row and the horse being arranged at the opposite side of the same. By this construction the cotton-chopper is easily guided and is maintained in proper position with relation to the row operated on.

The blade or hoe 2 is provided with a shank or rod 13ª, forming an arm of a shaft 14, which extends longitudinally of the machine, at the center thereof, its front end 15 being journaled in a suitable bearing of the rear end of the front connecting block or piece 5, and its rear portion being arranged in a suitable bearing 16. The bearing 16 is mounted on the transverse bar 7, and the rear end of the longitudinal shaft extends beyond the cross piece or bar 7 and carries a pinion 17. The shank or arm 13ª is supported by a brace 18, consisting of an approximately U-shaped piece of metal centrally connected to the shank or arm and secured at its ends to the longitudinal shaft at opposite sides of the said shank or arm. By this construction the shank or arm is firmly braced and is securely held in proper position.

The pinion 17 meshes with a gear-wheel 19, fixed to the axle and operated by the rear carrying-wheels, whereby when the machine moves forward the longitudinal shaft will be rotated.

The machine is provided with a pair of inclined handle-bars 20, terminating at their upper ends in curved handles or grips and secured at their lower ends to perforated ears 21 by bolts or other suitable fastening devices piercing the bars 20 and the ears. The handle-bars are supported in an inclined position by braces 22, secured at their upper ends to the handle-bars, near the centers thereof, by bolts 23 or other suitable fastening devices and connected at their lower ends with the rearwardly-extending arms or portions 6 of the side bars 1. These braces may, if desired, be pierced for the reception of the axle 8, or they may be secured to the rearwardly-extending arms or portions 6 in any other desired manner. The perforated ears 21 consist of plates interposed between the ends of the transverse bar 7 and the adjacent portions of the side bars, and they extend above the same to receive the fastening devices of the lower ends of the handle-bars, which are fitted against the upper edges of the side bars 1 of the frame. The handle-bars are connected near their upper ends by a transverse rung 24. As the machine advances the longitudinal shaft is rotated, and the blade or hoe chops out the plants at intervals, as will be readily understood, and gears of any diameter may be employed for rotating the chopper or blade at the desired speed to produce any desired number of revolutions of the longitudinal shaft while the machine advances a given distance. By this construction the plants may be chopped out at any desired interval.

It will be seen that the cotton and rice chopper is exceedingly simple and inexpensive in construction, that it is strong and durable, and that as the front guide-wheel is located at one side of the row operated on and the horse or other draft-animal walks in the furrow at the opposite side of the row it will be clear that the machine is adapted to run easy and is easily guided and maintained in proper position with relation to the row operated on; also, by reason of the machine being maintained in proper position in this manner a large area of plants may be rapidly operated on.

Having thus fully described my invention, what I claim as new, and desire to secure by Letters Patent, is—

1. A cotton and rice chopper provided at its front at one side of the center with a combined carrying and guide wheel arranged to run in the furrow at one side of the row operated on, and means located at the opposite sides of the center for connecting a draft-animal with the cotton and rice chopper, substantially as described.

2. A cotton and rice chopper provided at the front with a combined guide and supporting wheel, laterally offset from the center and arranged to run in the furrow at one side of the row operated on by the cotton and rice chopper, and forming the sole support of the front of the machine, substantially as described.

3. A cotton and rice chopper provided with a frame comprising side bars having front arms located at opposite sides of the center, a piece interposed between the arms and connecting the same, and a front wheel mounted on the frame at one side of the connecting-piece and arranged to run in the furrow at one side of the row operated on and forming the sole support of the front of the machine, substantially as described.

4. A cotton and rice chopper provided at its front at one side of the center with a combined guide and supporting wheel, arranged to run in the furrow and forming the sole support for the front of the machine, and a clevis connected with the front of the combined cotton and rice chopper and located at the opposite side of the same in position to permit the draft-animal to walk in the furrow, substantially as described.

5. A cotton and rice chopper provided with a frame comprising side bars offset from each other between their ends and provided with front and rear arms, a front connecting-piece interposed between the front arms, and a cross-bar connecting the side bars at the inner terminals of the rear arms, a stub-axle extending from one side of the connecting-piece, an axle located at the rear ends of the rear arms, wheels mounted on the said axles, a blade, and gearing for operating the same, substantially as described.

6. A cotton and rice chopper comprising a frame composed of side bars having angularly-bent laterally-offset intermediate portions forming an open space, a connecting-piece interposed between the front portions of the side bars, a transverse bar connecting the side bars at the rear ends of the offset portions, and plates interposed between the ends of the cross-bar and the side bars and extending upward to form ears, handles secured to the ears, wheels supporting the frame, a blade, and gearing for operating the same, substantially as described.

7. A cotton and rice chopper comprising a frame composed of side bars provided with laterally-offset portions having rearwardly-extending arms, a transverse piece interposed between the sides and connecting the same at the inner ends of the said arms, and a front piece interposed between the front portions of the side bars, an axle connecting the rear ends of the said arms, a pair of wheels mounted on the axle and arranged between the arms and spaced apart to straddle the row, a longitudinal shaft journaled on the said pieces and provided with a blade, and gearing located between the said arms and connecting the shaft and the axle, substantially as described.

8. A cotton and rice chopper comprising a frame composed of side bars having laterally-offset intermediate portions forming an open space, a connecting-piece interposed between the front portions of the side bars, and a cross-bar connecting the side bars at the inner ends of the rear portions, a combined guide and supporting wheel arranged at the front of the frame in position to run in the furrow at one side of the row operated on by the machine, a clevis mounted on the frame at the opposite side of the same in position to permit a draft-animal to walk in the furrow, rear wheels arranged in the space between the rear portions of the side bars, a blade operating in the space between the offset portions of the sliding bar, and gearing for operating the blade, substantially as described.

In testimony that I claim the foregoing as my own I have hereto affixed my signature in the presence of two witnesses.

HENRY E. W. KIRKLAND.

Witnesses:
   M. H. WILKINSON,
   B. F. BUTLER.